(12) United States Patent
Casagrande

(10) Patent No.: US 9,560,408 B2
(45) Date of Patent: Jan. 31, 2017

(54) TRACKING AND DISPLAYING POPULAR MEDIA CONTENT

(71) Applicant: EchoStar Technologies L.L.C., Englewood, CO (US)

(72) Inventor: Steven M. Casagrande, Castle Pines, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/699,342

(22) Filed: Apr. 29, 2015

(65) Prior Publication Data

US 2016/0323625 A1 Nov. 3, 2016

(51) Int. Cl.
| | | |
|---|---|---|
| H04H 60/33 | (2008.01) | |
| H04N 21/426 | (2011.01) | |
| H04N 21/258 | (2011.01) | |
| H04N 21/84 | (2011.01) | |

(52) U.S. Cl.
CPC .... *H04N 21/4263* (2013.01); *H04N 21/25891* (2013.01); *H04N 21/84* (2013.01)

(58) Field of Classification Search
CPC combination set(s) only.
See application file for complete search history.

(56) References Cited

U.S. PATENT DOCUMENTS 8,640,165 B2 *  1/2014  Ellis ............... H04N 5/44543
                                                  725/38

* cited by examiner

*Primary Examiner* — Kieu Oanh T Bui
(74) *Attorney, Agent, or Firm* — Bejin Bieneman PLC

(57) ABSTRACT

A media content processing system includes a first tuner programmed to receive a first media content signal and a second tuner programmed to receive a second media content signal. A processing device is programmed to receive a popularity signal representing a popularity of a media content instance. The processing device is further programmed to command the second tuner to tune to the media content instance identified by the popularity signal.

18 Claims, 3 Drawing Sheets

TRACKING AND DISPLAYING POPULAR MEDIA CONTENT

BACKGROUND

Media content processing devices, such as set top boxes, can record and store media content for later viewing. The media content processing device can be programmed to record upcoming shows or movies. Recordings can be scheduled individually or in accordance with a subscription. An individual recording may be scheduled if only a particular showing of a media content instance is desired. Therefore, individual recordings may be used to record movies. A television series or another type of show with multiple episodes, however, may be recorded using a series timer. The series timer may record all or a subset of all showings of episodes associated with a particular media content instance. The subset may exclude reruns, recently viewed episodes, episodes from a particular season, already recorded episodes, and so on.

DETAILED DESCRIPTION

Set top boxes and other media content processing devices that require the user to manually record shows, either individually or by subscription, are most effective if the user is aware of what content he or she wishes to record. This means that the user must know what content is currently being shown or will be shown in the near future and remember to program the set top box to record the desired media content. Otherwise, the user could miss live airings of popular media content such as sporting events, breaking news broadcasts, award shows, concerts, season or series finales of popular television shows, and so on, especially if the user is watching something else, including live or previously recorded content.

Using curated or crowd-sourced information, a media content processing device can notify a user of popular media content, which may include media content that many viewers are currently watching, and give the user the option to record or view the popular media content. Media content may be curated by an entity that tracks viewing habits relative to different genres and determines what content is "exciting" or popular. Popular media content may refer to entire media content instances (e.g., an entire show or entire sporting event) or just a portion of a media content instance (e.g., a particular play during a sporting event, the last few minutes of a close game, a featured news story during a news broadcast, etc.). The media content processing system may include a first tuner programmed to receive a first media content signal and a second tuner programmed to receive a second media content signal. Further, a processing device is programmed to receive a popularity signal representing a popularity of a media content instance. The processing device is further programmed to command the second tuner to tune to the media content instance identified by the popularity signal. Based on the popularity signal, the processing device can, via a display device, prompt the user to select whether to continue watching the current media content, switch to the popular media content, or record the popular media content for later. Moreover, the most popular portions of the popular media content, such as an exciting play during a sporting event or the most relevant portion of a breaking news story, may be time-stamped so that the user can view just that part of the popular media content.

The elements shown may take many different forms and include multiple and/or alternate components and facilities. The example components illustrated are not intended to be limiting. Indeed, additional or alternative components and/or implementations may be used.

Figure 1:
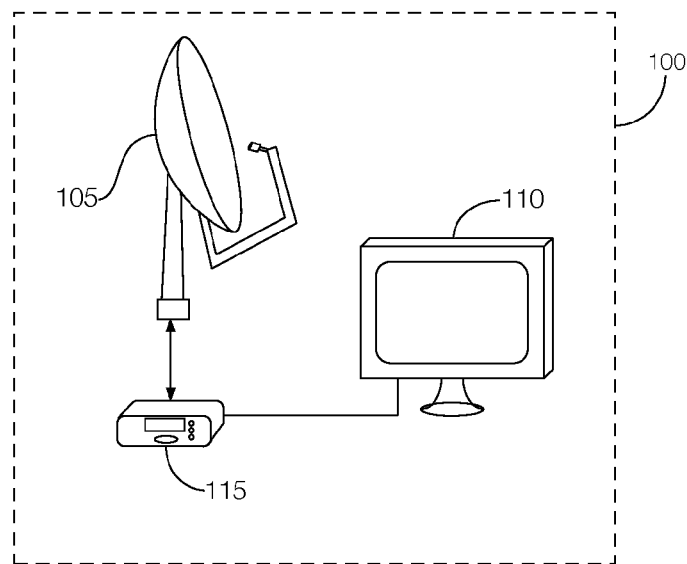
FIG. 1 illustrates an example environment with a media content processing device programmed to track and display popular media content.

As illustrated in FIG. 1, the environment 100 includes a satellite antenna 105, a display device 110, and a media content processing device 115.

The satellite antenna 105 may include any electronic device configured or programmed to receive signals from a content provider over, e.g., a satellite telecommunications network. The satellite antenna 105 may, therefore, receive encoded media content signals representing television shows, movies, videos, games, websites, music, etc. The satellite antenna 105 may be configured to receive other signals as well. For instance, the satellite antenna 105 may be programmed to receive signals representing the popularity of media content instances, as discussed in greater detail below.

The display device 110 may include any electronic device configured or programmed to display media content. The display device 110, therefore, may include a television, computer monitor, or mobile device such as a cell phone or tablet computer. The display device 110 may be configured to receive processed media content signals from, e.g., the media content processing device 115 via a wired or wireless connection.

The media content processing device 115 may include a computing device programmed to receive and process media content signals from the satellite antenna 105. The media content processing device 115 may be configured or programmed to receive media content signals transmitted over a wired or wireless communication channel. The media content processing device 115 may be programmed to process received media content signals so that the media content represented by the media content signal may be presented to a user on, e.g., the display device 110, such as a television, computer monitor, tablet computer, speakers, etc.

As discussed in greater detail below, the media content processing device 115 may be programmed to receive the popularity signal from the satellite antenna 105, which as discussed above may identify popular media content. An uplink or server may transmit the popularity signal to the media content processing device 115 via a control message path. Although not shown, the control message path may include various components that facilitate satellite or IP communication protocols, for example. The media content processing device 115 may automatically tune to and begin recording the popular media content. The media content processing device 115 may not record all popular media content. In some possible implementations, the media content processing device 115 may only record media content with a popularity above a predetermined threshold. The predetermined threshold may be based on a calibration value or user setting. Moreover, the predetermined threshold may be different for different types of media content. That is, the predetermined threshold for a sporting event may be different than the predetermined threshold for a news broadcast. Thus, the user may adjust the predetermined threshold according to the type of media content. Alternatively, the predetermined threshold may be adjusted by the media content processing device 115 or remotely by a telecommunication company (e.g., a common carrier) or a third-party organization. The media content processing device 115, common carrier, or third-party organization may track user behavior relative to a particular media content instance or type of media content instance to determine which types of media content instance the users of the media content processing device 115 find exciting. By way of example, the user may find a basketball game more exciting than a hockey game, and based on the user's viewing habits, the media content processing device 115, common carrier, or third-party organization may adjust the predetermined threshold accordingly. Moreover, the predetermined threshold may be genre-specific, or demographics associated with the user may be further used to adjust the predetermined threshold.

The recording may end when the media content instance has concluded (e.g., the end of a program or sporting event) or when the popularity drops below the predetermined threshold. Thus, the media content processing device 115 may only record popular portions of particular broadcasts. By way of example only, the media content processing device 115 may record certain plays from a sporting event without recording the entire game or certain breaking news stories without recording the rest of the news broadcast. Moreover, in anticipation of certain programs likely to be popular, such as the series premier of a popular television show or the expectation of a popular celebrity appearing on a late-night talk show, the popularity of that show may be set in advance of its broadcast.

With one of the available tuners tuned to the popular media content, the media content processing device 115 may selectively display either the popular media content or other media content. The decision whether to selectively display the popular or other media content may be based on, e.g., a user input received via, e.g., a remote device in wireless communication with the media content processing device 115.

In some possible approaches, the popularity signal may further identify a popular event portion via a timestamp. The timestamp may identify the time at which a popular event occurs during the popular media content. The media content processing device 115 may prompt the user if he or she wishes to skip directly to the popular event portion of the popular media content. The user's response may be received via a user input provided via, e.g., the remote device.

Figure 2:
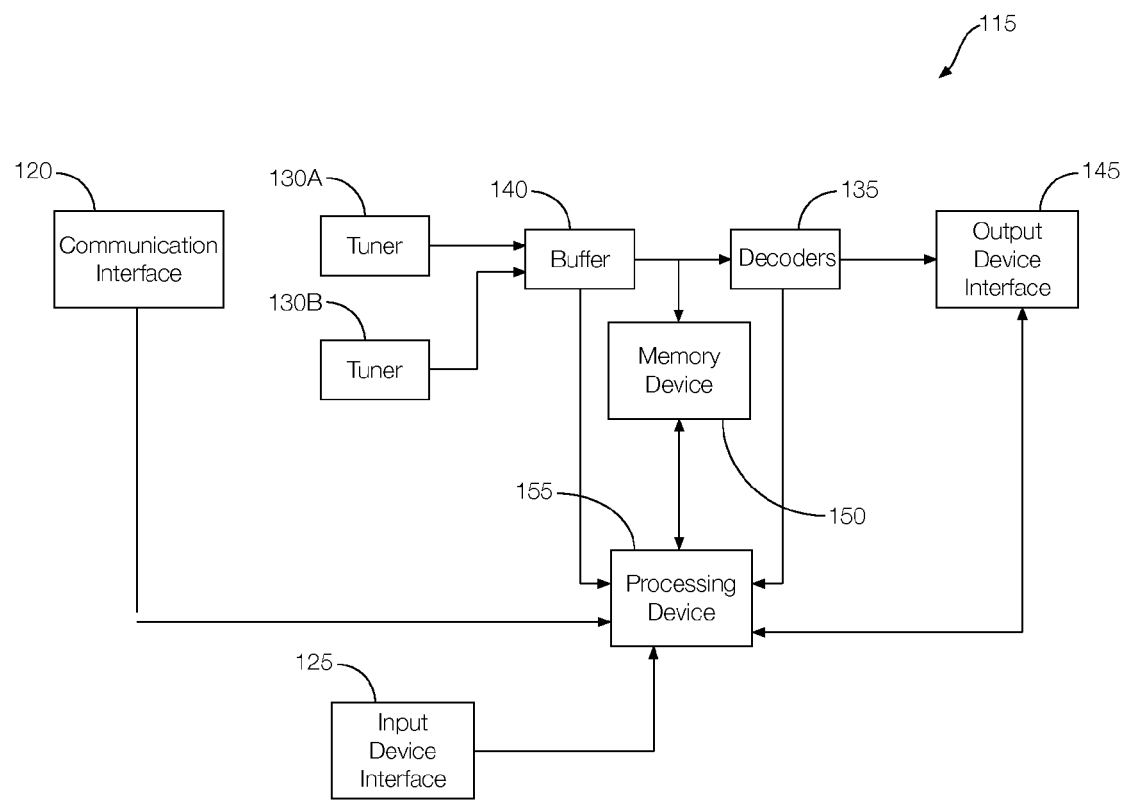
FIG. 2 is an example block diagram of the media content processing device of FIG. 1.

FIG. 2 is an example block diagram of the media content processing device 115. As shown, the media content processing device 115 includes a communication interface 120, an input device interface 125, multiple tuners 130, one or more decoders 135, a buffer 140, an output device interface 145, a memory device 150, and a processing device 155.

The communication interface 120 may include any electronic device configured or programmed to receive signals from, e.g., the satellite antenna 105 or an access point. The communication interface 120 may be configured for wired or wireless communication. The communication interface 120 may be configured or programmed to comply with any number of communication protocols including, e.g., Bluetooth® or WiFi, or the communication interface 120 may connect to a cable headend or receive signals via an over-the-air (OTA) antenna.

The input device interface 125 may include an electronic device configured or programmed to wirelessly receive signals from a remote device. The input device interface 125 may be configured or programmed to receive signals transmitted in accordance with any number of wireless communication protocols. For instance, the input device interface 125 may be configured to receive infrared signals or radio frequency signals in accordance with, e.g., WiFi or Bluetooth® communication protocols.

The tuners 130 may include any number of electronic devices configured or programmed to receive media content signals. The tuners 130 may be configured for wired or wireless communication. For example, the tuners 130 may be configured to receive media content signals transmitted wirelessly from an access point. The tuners 130 may be configured or programmed to comply with any number of wireless communication protocols. Alternatively or in addition, the tuners 130 may be configured or programmed to receive media content signals through a wired communication channel. For instance, the tuners 130 may receive media content signals from, e.g., the satellite antenna 105. Once media content signals are received, each tuner 130 may output received media content signals to, e.g., the decoders 135 or another component of the media content processing device 115. While two tuners 130 are shown, the media content processing device 115 may include any number of additional tuners 130.

Each decoder 135 may include any electronic device configured or programmed to decode received media content signals. Media content signals may be encoded by a content provider prior to transmitting the media content signals to the satellite antenna 105. The satellite antenna 105 may transmit the encoded media signal to the media content processing device 115. The decoder 135 may decode the encoded media content signal. Decoding the media content signal may allow the media content to be viewed on the display device 110 such as, e.g., a television or other display. In some instances, the decoder 135 may be configured or programmed to perform an error correction or error concealment process (e.g., repeating the last frame of the video and not displaying a new frame with errors) process to the media content signal. The error correction process may mitigate errors in the media content signal caused by wirelessly transmitting the media content signal to the satellite antenna 105, to the media content processing device 115, or both.

The buffer 140 may include any electronic device configured or programmed to temporarily store the media content signal before the media content signal is decoded. For instance, the buffer 140 may include a physical data memory storage to store the media content signal after the media content signal is received via the communication interface 120 and before the media content signal is output to the display device 110 for presentation to a user. In some possible implementations, the buffer 140 may be configured to store a limited amount of data. The amount of storage space available in the buffer 140 may be referred to as the buffer 140 capacity. Thus, as more and more data is stored in the buffer 140, the buffer 140 capacity may be reduced. Buffer 140 capacity, therefore, increases as the data stored in the buffer 140 is accessed and processed by the decoder 135.

The output device interface 145 may include any electronic device configured or programmed to output the decoded media content signal to the display device 110 such as a television or other display. The output device interface 145 may be configured to output the media content signal in accordance with any number of protocols including, e.g., HDMI, DVI, S-Video, Component Video, Composite Video, or the like. In one possible implementation, the output device interface 145 may be programmed to access the media content signal from the buffer 140 according to a first in, first out (FIFO) methodology. Alternatively, the media content signal may be transmitted to the output device interface 145 by, e.g., the decoder 135 or the processing device 155.

The memory device 150 may include any electronic device programmed to electronically store media content, such as encoded MPEG files. For instance, the memory device 150 may include a hard disk drive, a solid-state storage drive, or the like. The data stored in the memory device 150 may be accessible by, e.g., the processing device 155 or the decoders 135, and the media content stored in the memory device 150 may be output to the display device 110 so that it may be viewed by the user.

The processing device 155 may include any computing device programmed to receive and process media content signals and the popularity signal received from the satellite antenna 105. Alternatively, the popularity signal may be delivered via cable, an over-the-air signal, or another protocol such as via an IP network or the Internet. As discussed above, the popularity signal may relate to the popularity of a media content instance. The processing device 155 may be programmed to command one or more available tuners 130 to tune to and begin to record the popular media content. An available tuner 130 may refer to any tuner 130 that is not currently receiving content that is being watched or recorded.

In one possible approach, the processing device 155 may be programmed to compare the popularity of the media content, as represented by the popularity signal, to a predetermined threshold. The predetermined threshold may be based on a calibration value or set by the user. Moreover, the predetermined threshold may be different for different types of media content. That is, the predetermined threshold for a sporting event may be different than the predetermined threshold for a news broadcast. Thus, the user may adjust the predetermined threshold according to the type of media content. If the popularity exceeds the predetermined threshold, the processing device 155 may command one of the available tuners 130 to begin recording the popular media content instance without user intervention. Popular media content, therefore, may be automatically recorded and stored in the memory device 150 whether the user is aware of the popular media content prior to its original airing or not.

For example, the processing device 155 may output a first media content signal, received via a first tuner 130A, to the display device 110. The first media content signal may be associated with the media content being shown on a channel selected by the user. While showing that media content, the processing device 155 may receive the popularity signal identifying a popular media content instance. The popularity signal may further include a timestamp of a popular event portion of the popular media content instance. The popular event portion may include one team scoring in a popular sports event, especially if the score causes the lead to change (the scoring team is now winning). Also, in the sports context, the popular event portion may include a likely upset in progress. An example of a likely upset in progress may include an underdog (i.e., the team not predicted to win) beating the favorite (i.e., the team predicted to win) with only a few minutes remaining in the game.

The processing device 155 may compare the popularity of the popular media content instance to a predetermined threshold that may or may not be based on the type of media content. If the popularity of the popular media content instance exceeds the predetermined threshold, the processing device 155 may command a second tuner 130B, which may be an available tuner 130, to tune to and record the popular media content instance and store the popular media content instance in the memory device 150.

The processing device 155 may be further programmed to notify the user, via the display device 110, of the popular media content being recorded on the available tuner 130. The notification may include, e.g., a prompt to view the popular media content, a prompt to navigate directly to the popular event portion, or a prompt to ignore the popular media content. The processing device 155 may switch the output from the media content received via the first tuner 130A to the popular media content received via the second tuner 130B if the user selects to view the popular media content. Moreover, the processing device 155 may begin playback of the popular media content at the popular event portion, based on a timestamp, if the user selects to navigate directly to the popular event portion. Ignoring the popular media content may include storing the popular media content in the memory device 150 for later viewing or stopping the recording of the popular media content and deleting the popular media content from the memory device 150. If the popular media content is ignored, the processing device 155 may continue to output the media content received via the first tuner 130A to the display device 110. The decision whether to display or ignore the popular media content, and the decision whether to store or delete the popular media content, may be based on a user input received via, e.g., the input device interface 125.

Figure 3:
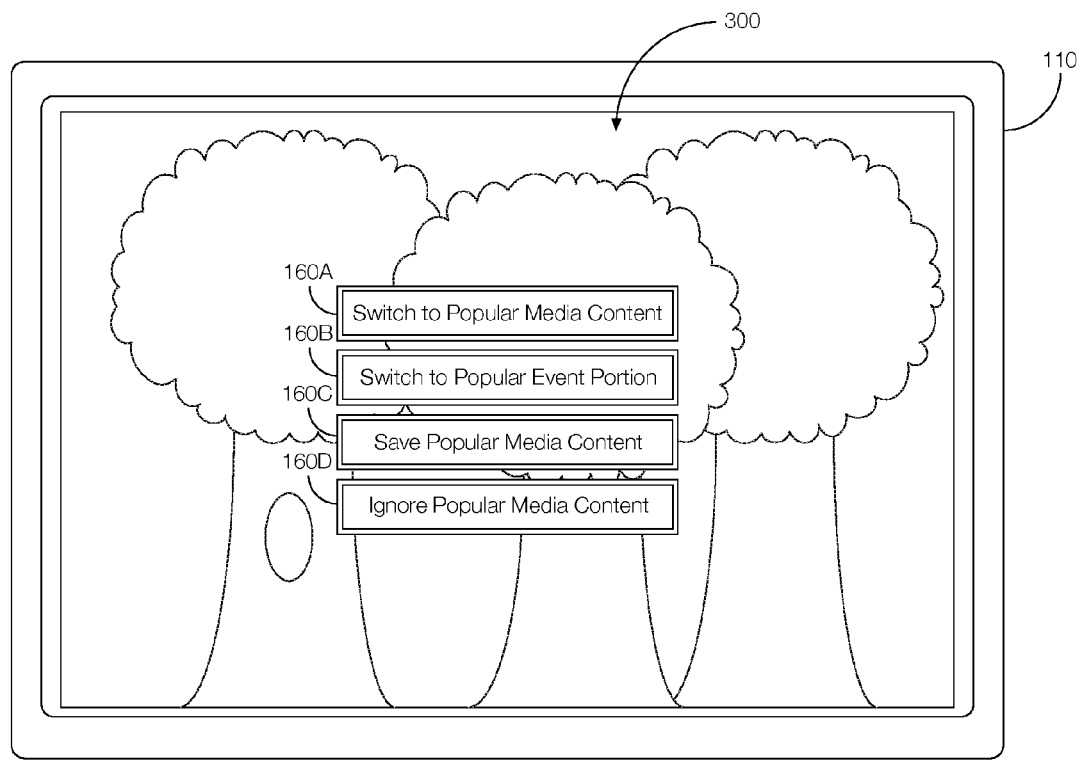
FIG. 3 is one example graphical user interface that may be presented on the display device to prompt a user to watch popular media content on a different tuner.

FIG. 3 is one example graphical user interface 300 that may be presented on the display device 110 to prompt a user to watch popular media content on a different tuner 130. The graphical user interface 300 may be presented while the user is already watching live or recoded media content. Live media content may be received via a first tuner 130A while previously recorded media content may be accessed from the memory device 150. The graphical user interface includes a number of options 160. A first option 160A may include watching the popular media content. A second option 160B may include going directly to the popular event portion of the popular media content. A third option 160C may include saving the popular media content in the memory device 150 to watch later. A fourth option 160D may include ignoring the popular media content and deleting any saved portion of the popular media content from the memory device 150. The user may navigate to and select any of the options 160 using a remote device in communication with the input device interface 125 of the media content processing device 115. The user input representing the user's selection of one of the options 160 may be received via the input device interface 125, and the processing device 155 may process the user input.

Figure 4:
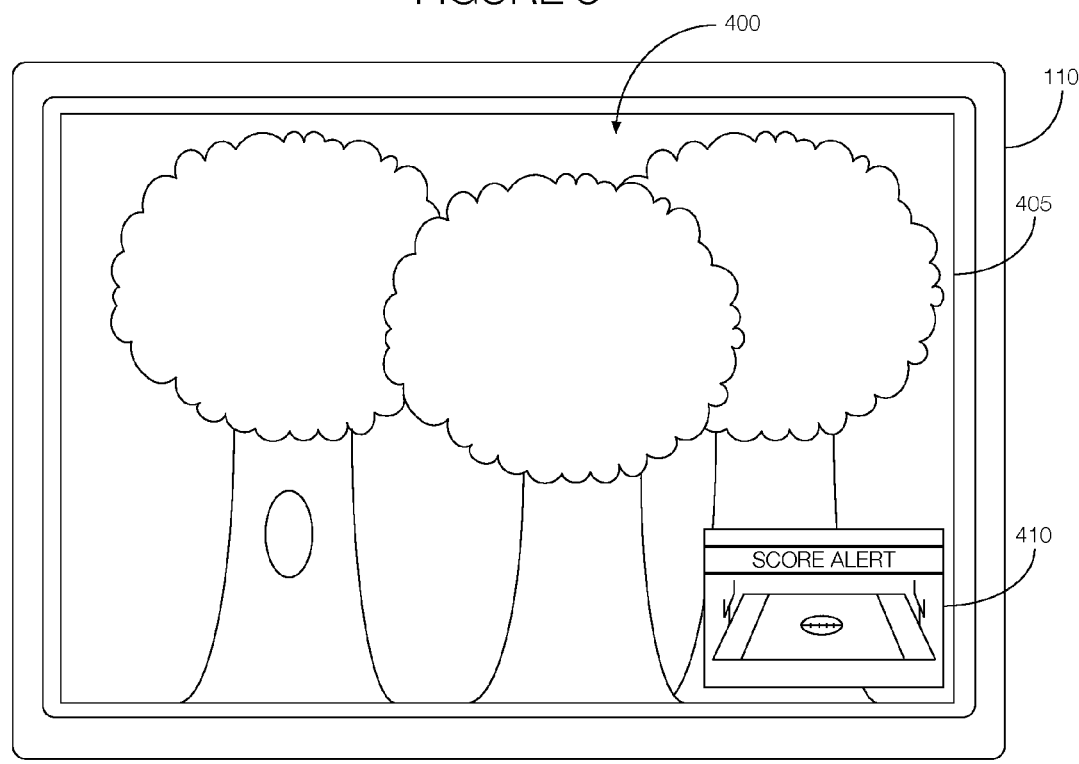
FIG. 4 is another example graphical user interface that may be presented on the display device to present the popular media content alongside media content currently being watched.

FIG. 4 is another example graphical user interface 400 that may be presented on the display device 110 to present the popular media content alongside media content currently being watched. In this example approach, the media content received on the first tuner 130A or accessed from the memory device 150 may be shown in a first window 405 while the popular media content may be shown in a second window 410. As shown, the second window 410 may be smaller than the first window 405. Alternatively, the first and second windows 405, 410 may be the same size. The first and second windows 405, 410 may be selectable via a user input. When the first window 405 is selected, the second window 410 may be removed from the graphical user interface 400. When the second window 410 is selected, the media content displayed in each window may be reversed. That is, upon selection of the second window 410, the popular media content originally presented in the second window 410 may be presented in the first window 405 and the other media content received via the first tuner 130A and originally presented in the first window 405 may be presented in the second window 410. The second window 410 showing the popular media content instance may appear automatically if the popularity of the popular media content instance exceeds the predetermined threshold.

Figure 5:
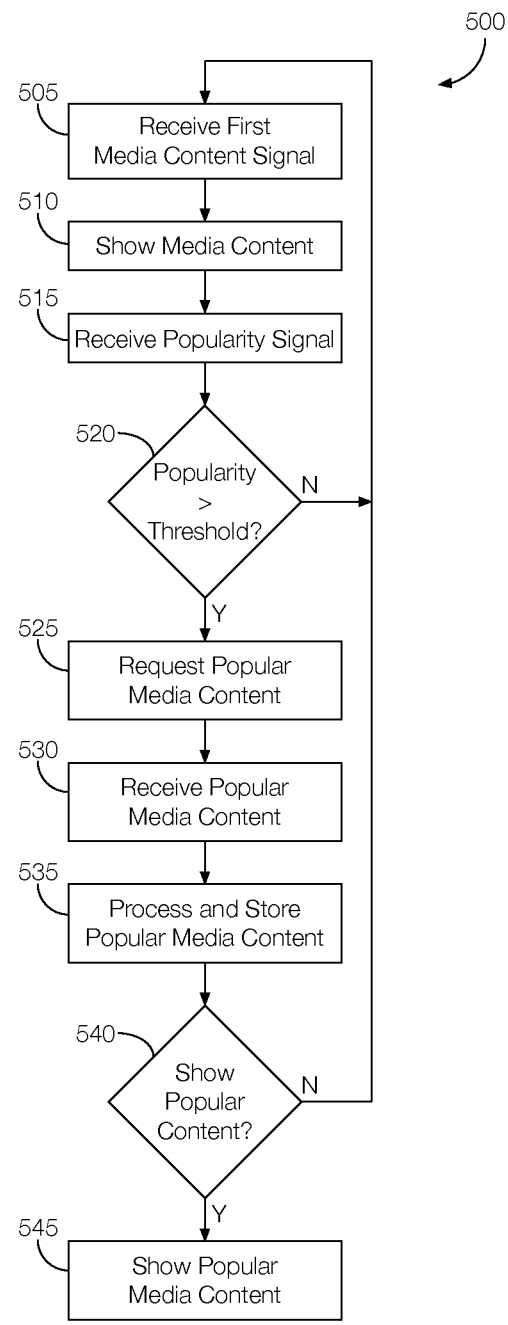
FIG. 5 is a flowchart of an example process that may be executed by the media content processing device to notify a user of popular media content on a different tuner.

FIG. 5 is a flowchart of an example process 500 that may be executed by the media content processing device 115 to notify a user of popular media content available for viewing on a different tuner 130. The process 500 may be initiated any time the media content processing device 115 is turned on.

At block 505, the media content processing device 115 may receive a first media content signal. The first media content signal may include media content shown on a channel selected by the user or media content streamed from a content provider. Therefore, the first media content signal may be received via the first tuner 130A. Alternatively or in addition, the first media content may be accessed from the memory device 150.

At block 510, the media content processing device 115 may process and output the first media content signal to the display device 110. The first media content signal may be processed by a decoder 135 and output to the display device 110 via the output device interface 145.

At block 515, the media content processing device 115 may receive a popularity signal. The popularity signal may be transmitted from a content provider to the satellite antenna 105 over a satellite communication network or via another communication path such as an IP connection over the Internet, SMS to a cell phone or other mobile device, a cellular radio embedded in the media content processing device 115, or the like. The popularity signal may be received via the communication interface 120 and processed by the processing device 155. The popularity signal may represent the popularity of a particular media content instance. The popularity signal may identify other information about the popular media content instance including, e.g., the genre (e.g., sporting event, news broadcast, concert, etc.). Alternatively, the genre may be determined from program guide information. In some instances, the popularity signal may further identify a popular event portion. The popular event portion may be identified in accordance with a timestamp.

At decision block 520, the media content processing device 115 may compare the popularity of the media content instance to a predetermined threshold. The predetermined threshold may be based on a calibration value or set by the user. Moreover, different predetermined thresholds may apply to different types of media content. Thus, prior to comparing the popularity to the predetermined threshold, the media content processing device 115 may determine the type of content identified in the popularity signal and the predetermined threshold associated with that type of content. If the popularity exceeds the predetermined threshold, the process 500 may proceed to block 525. Otherwise, the process 500 may return to block 505.

At block 525, the media content processing device 115 may request the popular media content. For instance, the processing device 155 may command an available tuner 130 to tune to and begin recording the media content identified by the popularity signal.

At block 530, the media content processing device 115 may begin to receive the popular media content via one of the available tuners 130, such as the second tuner 130B. For instance, the available tuner 130 may receive and process a second media content signal, which may be associated with the popular media content. The popular media content may be received from, e.g., the satellite antenna 105.

At block 535, the media content processing device 115 may process and store the popular media content. That is, the processed second media content signal associated with the popular media content may be stored in the memory device 150 so that it can be accessed and viewed at a later time.

At decision block 540, the media content processing device 115 may determine whether to continue to show the first media content signal received at block 505 or the second media content signal received at block 535. The decision to show the first or second media content signals may be based on, e.g., a user input. That is, the processing device 155 may output a prompt for the user to select whether he or she wishes to view the media content associated with the first media content signal or the popular media content associated with the second media content signal. The user input may be received by the input device interface 125, and the processing device 155 may determine which media content to show based on the user input. If no user input is received, the processing device 155 may, by default, continue to show the media content associated with first media content signal while storing the popular media content in the memory device 150. To show the media content associated with the first media content signal, the process 500 may return to block 505. To show the popular media content associated with the second media content signal received at block 535, the process 500 may proceed to block 545.

At block 545, the media content processing device 115 may process and output the second media content signal to the display device 110. The second media content signal may be processed by a decoder 135 and output to the display device 110 via the output device interface 145. If the popularity signal includes a timestamp identifying a popular event portion of the popular media content, the processing device 155 may prompt the user to select whether to navigate to the popular event portion as identified via the timestamp. The portion of the second media content signal output to the display device 110 may be based on whether or not the user input represents a user's desire to begin viewing the popular media content when the recording started or at the start of the popular event portion.

The process 500 may continue to execute block 545 until the media content processing device 115 is turned off or the user requests different media content.

Using curated or crowd-sourced information, the media content processing device 115 can notify a user of popular media content that the user might otherwise have missed. The media content processing device 115 can receive and record popular media content so that the user does not miss an exciting play during a sporting event or the most relevant portion of a breaking news story.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media content processing device comprising:
a first tuner programmed to receive a first media content signal;
a second tuner programmed to receive a second media content signal; and
a processing device programmed to receive a popularity signal representing a popularity of a media content instance, wherein the processing device is programmed to command the second tuner to tune to the media content instance identified by the popularity signal, wherein the processing device is programmed to compare the popularity represented by the popularity signal to a predetermined threshold and command the second tuner to tune to the media content instance identified by the popularity signal if the popularity exceeds the predetermined threshold.

2. The media content processing device of claim 1, wherein the predetermined threshold is associated with a media content genre.

3. The media content processing device of claim 1, further comprising a memory device programmed to store the second media content signal.

4. The media content processing device of claim 1, wherein the processing device is programmed to output the first media content signal to a display device prior to receiving the popularity signal.

5. The media content processing device of claim 4, wherein the processing device is programmed to selectively display one of the first media content signal and the second media content signal after receiving the popularity signal.

6. The media content processing device of claim 5, wherein the processing device is programmed to select one of the first media content signal and the second media content signal for display based at least in part on a user input.

7. The media content processing device of claim 1, wherein the popularity signal identifies a popular event portion associated with the media content instance, wherein the popular event portion is a subset of the media content instance.

8. The media content processing device of claim 7, wherein the popular event portion is defined by a timestamp.

9. The media content processing device of claim 8, wherein the processing device is programmed to navigate to the popular event portion based at least in part on the timestamp.

10. The media content processing device of claim 9, wherein the processing device is programmed to navigate to the popular event portion in response to a user input.

11. A method comprising:
receiving a first media content signal via a first tuner;
receiving a popularity signal representing a popularity of a media content instance;
comparing the popularity represented by the popularity signal to a predetermined threshold;
commanding a second tuner to tune to the media content instance identified by the popularity signal if the popularity exceeds the predetermined threshold; and
receiving the second media content signal via the second tuner.

12. The method of claim 10, further comprising outputting the first media content signal to a display device prior to receiving the popularity signal.

13. The method of claim 12, further comprising selectively displaying one of the first media content signal and the second media content signal after receiving the popularity signal.

14. The method of claim 13, further comprising selecting one of the first media content signal and the second media content signal for display based at least in part on a user input.

15. The method of claim 11, wherein the popularity signal identifies a popular event portion associated with the media content instance, wherein the popular event portion is a subset of the media content instance.

16. The method of claim 15, further comprising navigating to the popular event portion based at least in part on a timestamp associated with the popular event.

17. The method of claim 15, further comprising navigating to the popular event portion in response to a user input.

18. A media content processing device comprising:
a first tuner programmed to receive a first media content signal;
a second tuner programmed to receive a second media content signal; and
a processing device programmed to receive a popularity signal representing a popularity of a media content instance, compare the popularity represented by the popularity signal to a predetermined threshold, and command the second tuner to tune to the media content instance identified by the popularity signal if the popularity exceeds the predetermined threshold, wherein the processing device is programmed to selectively display, in response to a user input, one of the first media content signal and the second media content signal after receiving the popularity signal,
wherein the processing device is programmed to record the second media content signal for playback at a later time.

* * * * *